F. E. WALLIS.
CIRCUIT CLOSER FOR INDICATING DEVICES.
APPLICATION FILED OCT. 25, 1919.
1,402,696.
Patented Jan. 3, 1922.
2 SHEETS—SHEET 1.
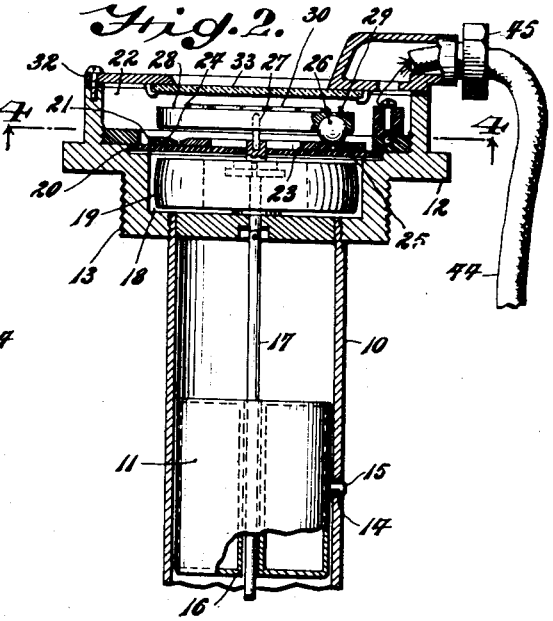
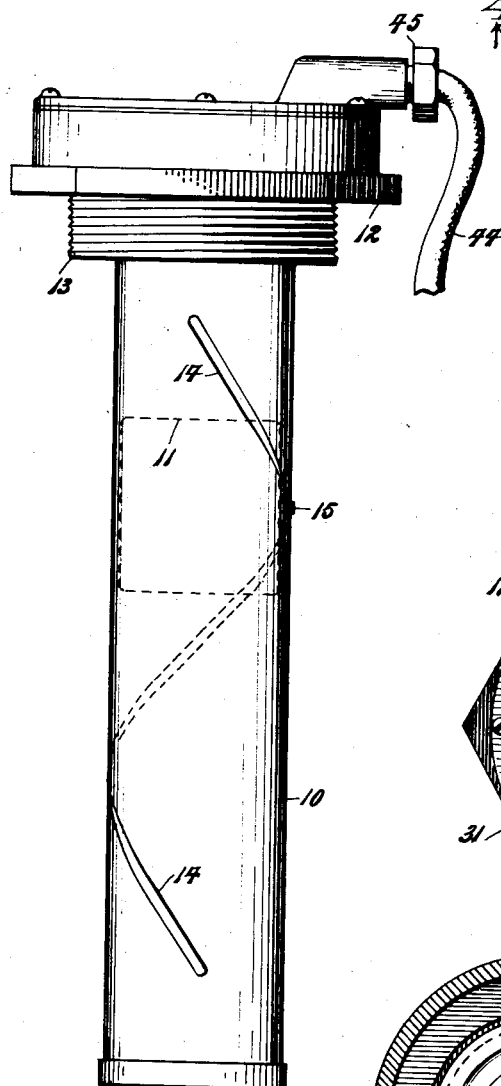
WITNESS:
Alfred T. Bratton
Frank E. Wallis
INVENTOR.
BY
Victor J. Evans
ATTORNEY.

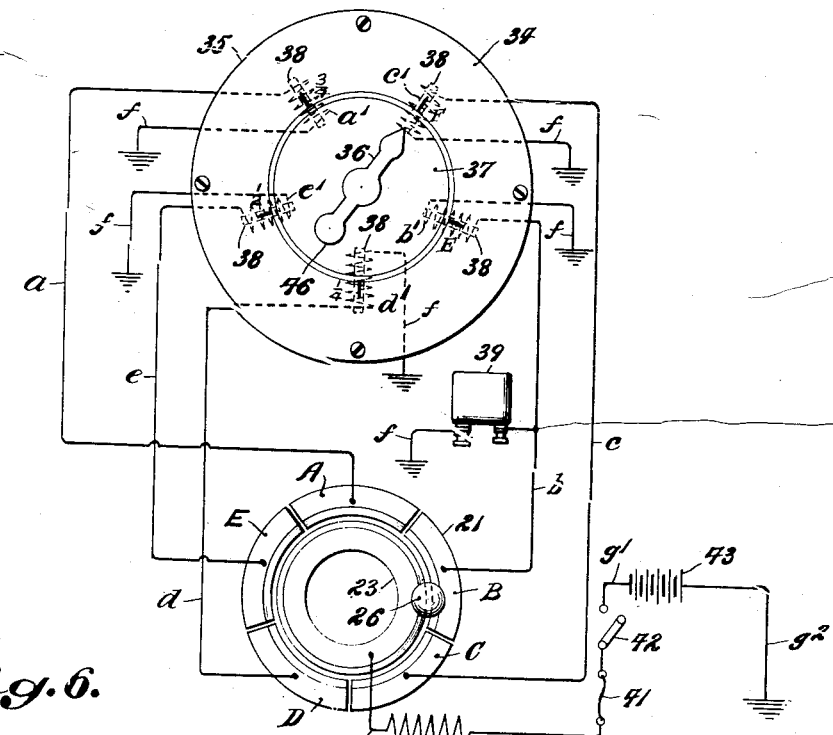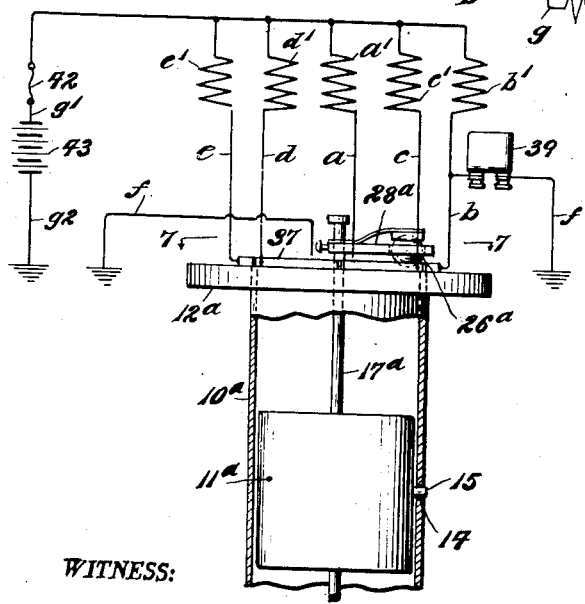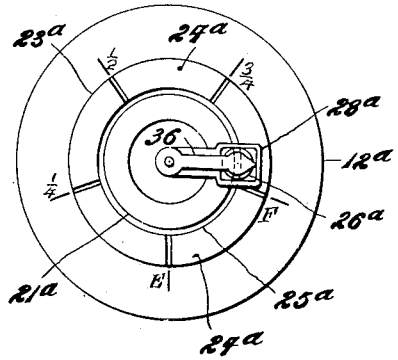

UNITED STATES PATENT OFFICE.

FRANK E. WALLIS, OF PHILADELPHIA, PENNSYLVANIA.

CIRCUIT CLOSER FOR INDICATING DEVICES.

1,402,696. Specification of Letters Patent. Patented Jan. 3, 1922.

Application filed October 25, 1919. Serial No. 333,139.

*To all whom it may concern:*

Be it known that I, FRANK E. WALLIS, a citizen of the United States, residing at Philadelphia, in the county of Philadelphia and State of Pennsylvania, have invented new and useful Improvements in Circuit Closers for Indicating Devices, of which the following is a specification.

The object of my present invention is the provision of a simple, inexpensive and practically advantageous circuit closer for indicating devices as hereinafter described and definitely claimed.

In the further disclosure of the invention, reference is to be had to the accompanying drawings, constituting a part of this specification, in which similar characters of reference denote corresponding parts in all the views, and in which,—

Figure 1—is a side elevation of the float mechanism.

Figure 2—is a vertical sectional view taken through the device with the lower part of the float tube broken away.

Figure 3—is a plan view of the structure shown in Figure 1.

Figure 4— is a horizontal sectional view taken on the line 4—4 in Figure 2, and

Figure 5—is a view partially diagrammatic showing the electric circuits and wiring system.

Figure 6—is a view partially diagrammatic showing a slightly modified form and the wiring system, and Figure 7—is a horizontal sectional view taken substantially on the line 7—7 in Figure 6.

Referring more particularly to the views, the numeral 10 indicates a float tube for a float 11, the tube being adapted to depend within the usual gasoline tank and carry at its upper end a casing 12 which is suitably threaded as at 13 for connection with the top of the tank. The tube 10 is formed with a spiral groove 14 in which operates a pin 15 extending from the float 11, the float 11 furthermore having a vertical passage 16 therethrough and through which passes a vertically disposed metallic or other flat strip 17 which may also be a squared shaft, the other upper end thereof projecting through the casing 12, as shown. The casing is formed with a chamber or compartment 18 in which is revolubly mounted a magnet 19, the upper end of the strip or shaft 17 connecting with the magnet so that as the float 11 rises or falls within the tube 10, the rotary action imparted to the float by the spiral groove 14 will bring about rotation of the magnet 19 through the medium of the strip or shaft 17. A covering or closure 20 for the compartment 18 is preferably made of some insulated material and carries a segmental contact ring 21, also providing another compartment 22 in the casing in superposition to the compartment 18 and in which compartment 22 the segmental contact ring 21 is disposed. Also arranged within the compartment 22 to repose upon the covering 20 is an inner contact ring 23 spaced slightly from the segmental contact ring 21, the latter being formed by a series of segmental sections 24 with the rings 21, 23, spaced apart sufficiently to form a runway 25 for a ball 26, freely revoluble thereon. A pivot 27 projects vertically from the covering or closure 20 and loosely mounted thereon to be freely revoluble, is a magnet 28 provided at its underside with a recess 29 for the reception of a part of the ball 26, the face of the magnet 28 being preferably provided with an indicator, or adapted to be formed in the nature of a dial as the case may be, although in this instance I have shown the top of the magnet 28 provided with an arrow 30. The casing 12 has a circular portion 31 forming a dial and in the rotation of the magnet 28 the arrow 30 pointing to different indications of depth of the gasoline tank on the circular portion 31, will indicate to a person the level of the liquid or capacity of the tank. The compartment 22 has a covering or closure 32 which has the central portion 33 thereof, preferably of glass so that the top of the magnet 28 will be clearly visible.

On the usual instrument board of an automobile I provide a meter or indicator 34 consisting of a casing 35 in which is arranged to rotate a pointer 36 operating over a dial 37, the pointer 36 being of a magnetic nature, with a series of magnets 38 arranged beneath the dial and which when energized will tend to actuate the pointer 36 as will be clearly understood.

Now referring to the segmental contact ring 21 it will be noted that the segmental sections 24 thereof, are marked A, B, C, D, E, and that electric wires *a, b, c, d, e*, extend from the respective segmental sections to connect with the electromagnets 38 and which have been here more particularly indicated as $a^1$, $b^1$, $c^1$, $d^1$, $e^1$, each of these electromagnets furthermore being grounded by means of suitable ground wires $f$. The segmental section B in this instance, is adapted to be indicative of a low level of liquid in the tank and for this reason the wire $b$, thereof has connection with a buzzer 39 having a ground wire $f$. From the inner contact ring 23 there extends a wire $g$, passing through a resistance coil 40 which in turn has connection with a fuse 41, a suitable switch 42 being provided in this circuit and which has a wire $g^1$, connecting with a battery 43. It will be noted that a wire $g^2$ is connected with the battery and is suitably grounded.

It will of course be apparent that all of the wires $a$, $b$, $c$, $d$, $e$, are housed in a cable 44, a suitable tubular conduit 45 for the cable being arranged to project from the cover 32.

Now it will be clear that when the switch 42 is closed, the particular position of the ball 26 will determine the position of the pointer 36 because the ball being the circuit closing member, will for instance, complete a circuit between the inner contact ring and the segmental section A to the electromagnet $a^1$, causing the pointer to point toward that particular electromagnet which has been energized and which by reason of the provision of the dial 37 will denote the depth of the liquid in the tank, and it will be also clear, that as the float rises and falls in the tube and the strip or shaft 17 is rotated, that rotation of the magnet 19 will result and that this will cause the magnet 28 to rotate, because of the tendency of magnets to have their like poles repel and have their unlike poles attract, thus actuating the ball in the runway so that it will come to rest at the point where the unlike attracting poles of the two magnets have brought the upper magnet to a stationary position the ball at this time spanning the gap between the contact ring 23 and one of the segmental sections 24 so that the circuit to one of the electromagnets $a^1$, $b^1$, $c^1$, $d^1$, $e^1$, will be closed thus causing the pointer to point toward the particular electromagnet which has been energized and thereby indicating to the operator adjacent the instrument board, the depth of the liquid in the tank.

The pointer 36 preferably has one end thereof weighted as at 46 so that when the switch 42 is open and none of the circuits are closed the pointer will assume a vertical position. Now inasmuch as the dial 37 is divided off to indicate various degrees of contents of the tank or in other words is divided into portions indicating "Empty," "¼ Full," "½ Full," "¾ Full" and "Full" it may be clear that the various segmental sections are similarly arranged and that when the ball is in contact with the segmental section having a wire connected to the electromagnet beneath that portion of the dial indicating "Full," when the float in the tank is at its uppermost position, the relative arrangement of the magnets 19, 28, and the segmental sections 24, will bring about the operation of the pointer 36 to point toward the mark "Full" on the dial 37 and so on in conformity with the depth of the liquid in the tank.

Now referring to Figure 5, it will be apparent that the electromagnet $b^1$, is indicative, with the portion of the dial 37 above the same, of the marking "Empty" and that when the circuit of this electromagnet is closed, the electric current will energize the buzzer 39 thus indicating to the operator by the sound of the buzzer that the tank is almost, if not empty, and that it is time to refill. Of course it will be understood that a visible signal, such as a light, can also be employed in place of the buzzer.

In Figures 6, 7, I disclose a slightly modified form of the device and which involves substantially the principle of operation described heretofore, but in which the particular device is adapted to a slightly different purpose. For instance the device described is particularly adapted for use in connection with the gasoline tanks of automobiles and because of the jarring of the vehicle as it operates over the highway, it is natural that the float 11 will be subjected to a continuous up and down movement. With the device shown in Figures 6, 7, I preferably aim to supply a construction which can be used in connection with stationary tanks containing liquids and which are rigidly supported so that the contained liquid will remain substantially quiet within the tank. Therefore instead of employing two magnets as for instance the magnets 19, 28, I provide on the top of the float tube $10^a$ from which is arranged the float $11^a$, a casing $12^a$ with the shaft or strip $17^a$ of the float passing upwardly through the casing or cover $12^a$ to rigidly connect with a ball holder $28^a$ carrying the ball $26^a$ which operates in the runway $25^a$ formed by the inner contact ring $21^a$ and the outer segmental contact ring $23^a$ having the segmental sections $24^a$.

The indicator for the instrument board and the wiring system thereto, are substantially the same as described heretofore in the preferred form of my device and therefore the same numerals are shown throughout.

Now it will be apparent that when the float $11^a$ falls in the tube $10^a$ due to the lowering of the level of liquid in the tank, rotation of the shaft or strip $17^a$ will rotate the holder $28^a$ bringing the ball $26^a$ into contact with one of the sections $24^a$ and which particular section with its accompanying electric circuit to the electromagnets of the indicator, will cause the pointer of the indicator to take a certain position indicative of the level of the liquid in the tank, this part of the modified construction being substantially the same as shown and described for the preferred form.

From the foregoing description it will be seen that the device described is in fact of very simple construction and that the mechanical features and electric system are of a very simple nature and calculated not to get out of order very readily. It will be apparent that the ball employed to close the circuits between the inner line and the various segmental sections together with the electric magnetic indicator employed assures correct operation of the indicator to correctly indicate the depth of the particular liquid contained in the tank.

Having described my invention, I claim—

In a circuit closer for indicating devices, the combination of a casing, an inner contact ring in the casing, an outer segmental contact ring in the casing and with said inner contact ring forming a circular runway, a revoluble holder, and a ball contact member carried by said holder and operating in said runway to constitute a bridging member.

In testimony whereof I affix my signature.

FRANK E. WALLIS.